(12) United States Patent
Oh

(10) Patent No.: US 7,460,308 B2
(45) Date of Patent: Dec. 2, 2008

(54) SLIM LIQUID LENS

(75) Inventor: Byung Do Oh, Gyunggi-Do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/635,548

(22) Filed: Dec. 8, 2006

(65) Prior Publication Data

US 2007/0133104 A1   Jun. 14, 2007

(30) Foreign Application Priority Data

Dec. 9, 2005   (KR) .................. 10-2005-0120540

(51) Int. Cl.
*G02B 1/06* (2006.01)
(52) U.S. Cl. ...................... 359/666; 359/665
(58) Field of Classification Search .......... 359/665, 359/666
See application file for complete search history.

(56) References Cited

U.S. PATENT DOCUMENTS 6,369,954 B1 * 4/2002 Berge et al. .............. 359/666

FOREIGN PATENT DOCUMENTS

| CN | 1705901 | 12/2005 |
| DE | 103 49 293 | 6/2005 |
| JP | 2001-249262 | 9/2001 |
| JP | 2001-249282 | 9/2001 |
| WO | 2004/038480 | 5/2004 |
| WO | WO 2005/109074 | 11/2005 |

OTHER PUBLICATIONS

Claude Gabay et al., "Dynamic study of a Varioptic variable focal lens", Proceedings of the SPIE vol. 4767 (2002), XP002335406, pp. 159-165.
Extended European Search Report, mailed Mar. 28, 2007 and issued in corresponding European Patent Application No. 06256266.5-1524.
Office Action issued in corresponding Chinese Patent Application No. 200610160990.0; mailed on Mar. 14, 2008.

* cited by examiner

*Primary Examiner*—William C Choi

(57) ABSTRACT

A depth of a hole for housing a liquid is minimized to obtain a slim liquid lens. In the liquid lens, a chamber has a hole formed therein. Insulating and electrolytic non-miscible fluids are housed in the hole, with the insulating fluid located at a bottom side, to form a spherical interface. The insulating and electrolytic fluids have different refractivities. The hole has a height greater than or equal to a bigger one of a height of an initial interface before electrowetting occurs and a height of a final interface when electrowetting has occurred to a maximum amount. The liquid lens has a hole perforated to a minimal depth considering a shape of the liquid interface which is governed by a contact angle and an inclination angle of the hole, thereby achieving slimness and compactness and enhancing operability of the lens.

6 Claims, 3 Drawing Sheets

SLIM LIQUID LENS

CLAIM OF PRIORITY

This application claims the benefit of Korean Patent Application No. 2005-120540 filed on Dec. 9, 2005 in the Korean Intellectual Property Office, the disclosure of which is incorporated herein by reference.

BACKGROUND OF THE INVENTION

1. Field of the Invention

The present invention relates to a liquid lens containing two different liquids therein, and more particularly, to a liquid lens which has a hole for housing the liquids perforated to a minimal depth to achieve slimness and compactness.

2. Description of the Related Art

A lens module in general use employs a lens made of solid such as glass whose focal distance is fixed. To perform focusing, such a lens module adopts a plurality of solid lenses which should be adjustably distanced from each other. This restricts miniaturization of the product and complicates driving for focusing.

For the purpose of overcoming the problem, a liquid lens has recently emerged. That is, the lens has two different liquids contained therein and is adapted to adjust its focus by changing the curvature radius of the interface (or meniscus) between the liquids. The liquid lens features a simple internal configuration which ensures miniaturization, and performs focusing more easily.

In early 2000, studies oh the liquid lens using electrowetting were conducted with tangible results, producing various applications. Also, efforts to put such liquid lens into industrial use have been stepped up. The liquid lens is advantageous over the conventional solid lens in terms of smaller size, low power consumption, fast response speed, and excellent reproducibility. Therefore, there have lately been vigorous attempts to apply the liquid lens to an automatic focus module of cameras mounted in mobile phones and PDAs.

A conventional liquid lens will be explained in detail with reference to the accompanying drawings.

FIG. 1 is a cross-sectional view illustrating a conventional liquid lens according to a first embodiment of the invention. FIG. 2 is a cross-sectional view illustrating a conventional liquid lens according to a second embodiment of the invention. FIG. 3 is a cross-sectional view illustrating a conventional liquid lens according to a third embodiment of the invention.

As shown in FIG. 1, the conventional liquid lens includes a chamber 10, a transparent plate 20, and two liquids. The chamber 10 is provided with a hole having a spherical cross-section. The transparent plate 20 hermetically seals an underside surface of the hole 12. Also, the two non-miscible liquids are housed in the hole 12.

Here, an insulating film is applied onto an inner wall of the hole 12 to ensure operation of the liquid lens.

Moreover, the two types of liquids are substantially equal in weight but different in refractivity. One of the liquids is conductive and the other liquid is non-conductive. In general, the liquid located at a top side is a conductive electrolytic fluid A and the liquid at a bottom side is a non-conductive insulating fluid B.

The two fluids A and B, when housed in the hole 12, have a predetermined degree of initial contact angle $\theta$ owing to different affinities of the fluids A and B to a wall of the hole 12, thereby forming a predetermined interface shape. The electrolytic fluid A and the insulating fluid B cooperate with the insulating film to form a concave interface between the fluids A and B.

The liquid lens configured as just described is subject to electrowetting when a voltage is applied and has an acute final contact angle. That is, the electrolytic fluid A and the insulating fluid B have an upwardly convex interface so as to function as a lens.

An ideal height of the liquid lens, when manufacture margin or environmental factor are not considered, is determined by an initial contact angle of the liquid (a contact angle when zero voltage is applied), a final contact angle (a contact angle at a highest operational voltage) and a shape of the hole 12. The electrolytic and insulating fluids A and B should possess lens characteristics to be employed in the liquid lens. Thus, the hole 12 is filled with pure electrolytic and insulating fluids A and B without any foreign elements such as bubbles that obstruct transmission of light, and then hermetically sealed. Accordingly, the height of the liquid lens is varied by that of the interface between the electrolytic and insulating fluids A and B.

When a contact angle is determined by the electrolytic fluid A, insulating fluid B and the inner wall of the hole, the interface between the electrolytic fluid A and the insulating fluid B (hereinafter "interface") becomes partially spherical. In a case where the interface has an acute contact angle due to electrowetting, the interface also becomes partially spherical.

Here, the initial contact angle is a value peculiar to characteristics of the liquid and thus varies with the type of the liquid housed in the hole 12. For example, in a case where the hole 12 is filled with the insulating fluid B having a contact angle of $\delta$, which is bigger than $\theta$, the interface, as shown in FIG. 2, is more concave. In this fashion, the greater initial contact angle of the interface leads to more concave interface, thereby necessitating a greater depth of the hole 12. This accordingly increases an overall height of the liquid lens, hampering miniaturization of the product.

To manufacture the chamber 10 for the liquid lens, the hole 12 has a minimum height determined by the initial contact angle of the liquid and a shape thereof. Then, the height of the hole 12 is optimized in consideration of a safety factor to design a lens with a smaller depth.

Also, in a case where an undercut is formed in a lower part of the inner wall of the hole 12 to facilitate manufacturing, when the interface is changed to form a final contact angle, a contact point of the interface and the inner wall of the hole 12 may be located lower than the undercut, thereby disabling the lens function.

Especially, in a case where the inner wall of the hole 12 is inclined inward so that it narrows downward as shown in FIG. 3 in order to obtain a lens with a smaller depth, a height from edge portions to a mid portion of the interface differs from that of the first conventional example shown in FIG. 1 despite the identical contact angle. Here, the difference of the height is varied according to change in an inclination angle of the inner wall of the hole 12. As described above, the minimum height of the hole 12 is optimized depending on the contact angle of the interface and shape of the inner wall to design the liquid lens effectively.

SUMMARY OF THE INVENTION

The present invention has been made to solve the foregoing problems of the prior art and it is therefore an object according to certain embodiments of the present invention is to provide a liquid lens which has a hole for housing a liquid perforated to a minimum depth to achieve slimness and compactness.

According to an aspect of the invention for realizing the object, there is provided a liquid lens including a chamber having a hole formed therein; and insulating and electrolytic non-miscible fluids housed in the hole, with the insulating fluid located at a bottom side, to form a spherical interface, the insulating and electrolytic fluids having different refractivities, wherein the hole has a height greater than or equal to a bigger one of a height of an initial interface before electrowetting occurs and a height of a final interface when electrowetting has occurred to a maximum amount.

The initial interface has a height according to following Equations 1 and 2, $$y = X\tan(\theta'/2), \qquad \text{Equation 1}$$

$$X = R\left[\frac{\tan\alpha}{\tan\alpha - \tan(\theta'/2)}\right], \qquad \text{Equation 2}$$

wherein y is a value of the height, X is a radius of an uppermost end of the hole, R is a radius of a lowermost end of the hole, $\theta'$ is a contact angle at the initial interface $-\pi/2$, and $\alpha$ is an inclination angle of an inner wall of the hole.

Also, the final interface has a height according to above Equation 1 and following Equations 3, 4 and 5, $$V_{oil} = \frac{\pi}{3}(X^3 - R^3)\tan\alpha - (\text{sgn})\frac{\pi\rho^3}{3}(\cos^3\theta' - 3\cos\theta' + 2), \qquad \text{Equation 3}$$

wherein where $\theta' \geq 0$, (sgn)=+1, and where $\theta'<0$, (sgn) =−1, $$X = \rho\sin\theta', \qquad \text{Equation 4}$$

$$P_w = \left[\frac{V_{oil} + \frac{\pi}{3}R^3\tan\alpha}{\frac{\pi}{3}\{\sin^3\theta'_w\tan\alpha - (\text{sgn})(\cos^3\theta'_w + 2)\}}\right]^{\frac{1}{3}}, \qquad \text{Equation 5}$$

wherein where $\theta' \geq 0$, (sgn)=+1, and where $\theta'<0$, (sgn)=−1, and wherein y is a value of the height, X is a radius of an uppermost end of the hole, R is a radius of a lowermost end of the hole, $\theta_w'$ is a contact angle of the final interface $-\pi/2$, $\alpha$ is an inclination angle of an inner wall of the hole, $\rho$ is a curvature radius of the initial interface, $\rho_w$ is a curvature radius of the final interface, and $V_{oil}$ is a volume of the insulating solution.

Preferably, an inclination angle of the hole is set larger by 10 to 50 degrees with respect to a value obtained by subtracting the contact angle of the initial interface from 180 degrees.

Furthermore, the hole is filled with the insulating fluid before electrowetting occurs in the inner wall of the hole and the hole is filled with the electrolytic fluid when electrowetting has occurred to a maximum amount, and a volume of the hole is added to a value calculated according to above Equation 3 to define the volume $V_{oil}$ of the insulating solution, thereby setting the height of the hole.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 1:
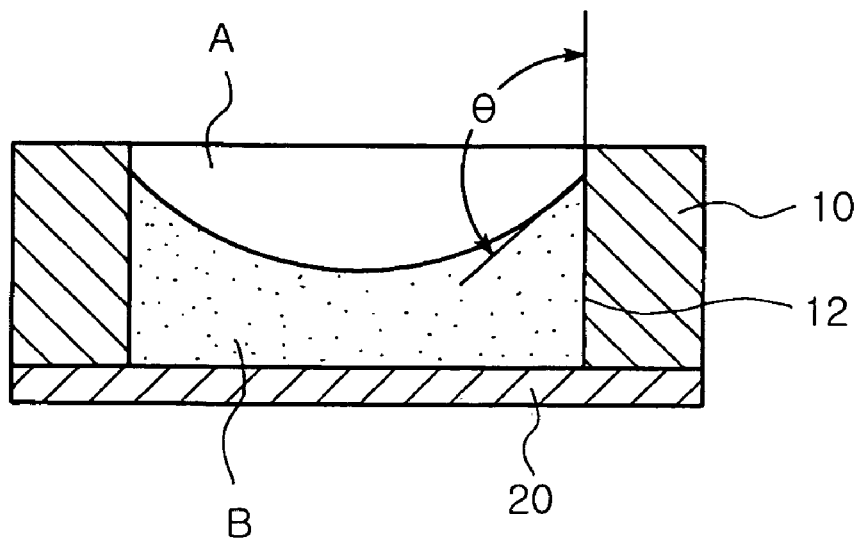
FIG. 1 is a cross-sectional view illustrating a conventional liquid lens according to a first embodiment of the invention.
Figure 2:
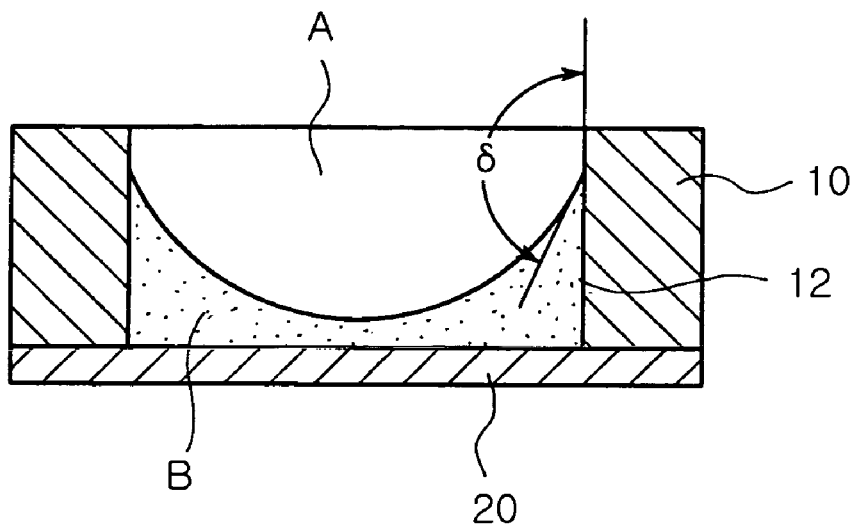
FIG. 2 is a cross-sectional view illustrating a conventional liquid lens according to a second embodiment of the invention.
Figure 3:
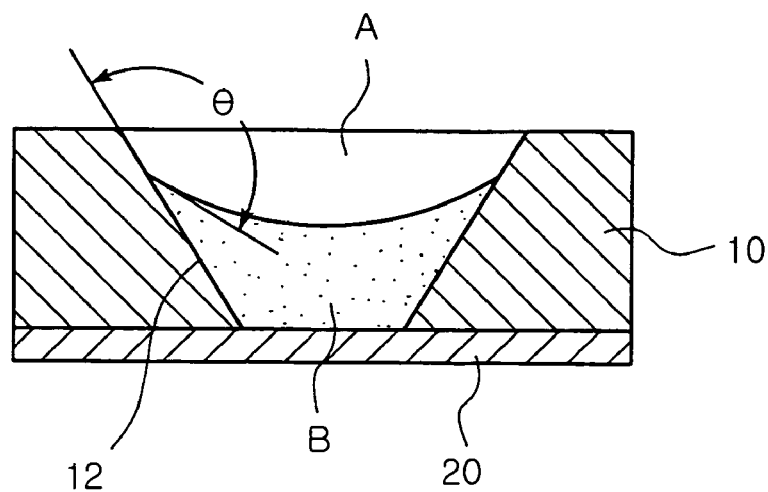
FIG. 3 is a cross-sectional view illustrating a conventional liquid lens according to a third embodiment of the invention.
Figure 4:
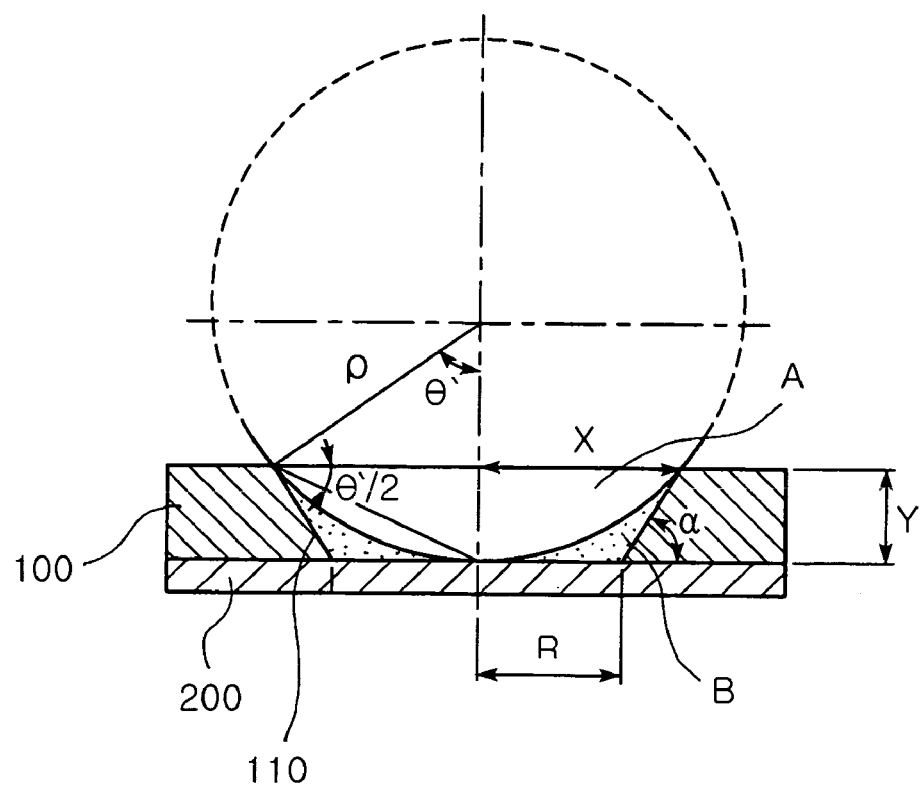
FIG. 4 is a cross-sectional view illustrating a liquid lens before electrowetting occurs according to the invention.

FIG. 4 is a cross-sectional view illustrating a liquid lens before electrowetting occurs according to the invention.

As shown in FIG. 4, the liquid lens of the invention includes a chamber 100, a lower transparent plate 200, an electrolytic fluid A and an insulating fluid B. The chamber 100 is provided with a hole 110 having an inner wall inclined narrowly downward at a predetermined angle $\alpha$. The inner wall of the hole 110 has a spherical cross-section. The lower transparent plate 200 serves to hermetically seal an underside surface of the hole 110. Also, the non-miscible electrolytic fluid A and insulating fluid B are housed in the hole 110. Here, although not illustrated in the drawings, an insulating film is applied onto the inner wall of the hole 110 to ensure operability of the liquid lens and an upper transparent plate is attached onto a top surface of the hole 110 to seal the electrolytic and insulating fluids A and B.

Furthermore, the electrolytic and insulating fluids A and B are substantially equal in weight but different in refractivity. The electrolytic fluid A is located on top of the fluid B.

The shape of the chamber 100 and characteristics of the electrolytic and insulating fluids A and B are identical to those employed in the conventional liquid lens, and thus will be explained in no more detail.

FIG. 4 shows an interface between the electrolytic fluid A and the insulating fluid B (hereinafter "interface") before electrowetting occurs. Also, in the chamber 100 of FIG. 4, a lowermost end of the interface abuts a bottom surface of the hole 110, and an outer edge of the interface abuts an uppermost end of the inner wall. That is, the outer edge of the interface is at the same height as the uppermost end of the inner wall. This minimizes the height of the chamber. A smaller height of the chamber 100 lowers an overall height of the liquid lens to ensure compactness, and shortens a path of light propagating through inside the liquid lens to boost transmissibility thereof.

However, if the chamber 100 is formed at a height lower than that shown in FIG. 4, the interface is not shaped as a partial sphere and thus uneven in refractivity so that the electrolytic and insulating fluids A and B cannot function as a lens.

In addition, due to absence of the insulating fluid B at a contact point between the interface and the bottom surface of the hole 110, preferably, the hole 110 is formed higher than the interface such that the bottom surface thereof is spaced apart from the interface at a predetermined distance to allow presence of the insulating fluid B on the entire bottom surface of the hole 110.

To minimize the height of the chamber 100, the hole 110 10 has a minimum height according to following Equations.

The hole 110 is minimized in its height when it is set to Y, i.e., the height equal to the interface, and the height Y is defined by Equation 1.

$$y = X \tan(\theta'/2) \qquad \text{Equation 1}$$

Here, X is a radius of an uppermost end of the hole 110, $\theta'$ is a contact angle at the initial interface, i.e., the angle obtained by subtracting $\pi/2$ from a contact angle of the interface before electrowetting occurs.

Meanwhile, X, which is the radius of the uppermost end of the hole 110 will be expressed with R, which is a radius of a lowermost end of the hole 110, according to Equation 2.

$$X = R \left[ \frac{\tan\alpha}{\tan\alpha - \tan(\theta'/2)} \right] \qquad \text{Equation 2}$$

Here, evidently, an inclination angle of the inner wall $\alpha$ is set larger than $\theta'/2$ so that the hole 110 abuts the interface at the uppermost end of the inner wall.

In a case where the radius X of the uppermost end of the hole 110 is set to a predetermined value, the height Y can be calculated by using only Equation 1. But in a case where the radius R of the lowermost end of the hole 110 and the inclination angle $\alpha$ of the inner wall are set to predetermined values, the height Y can be obtained according to Equations 1 and 2.

Figure 5:
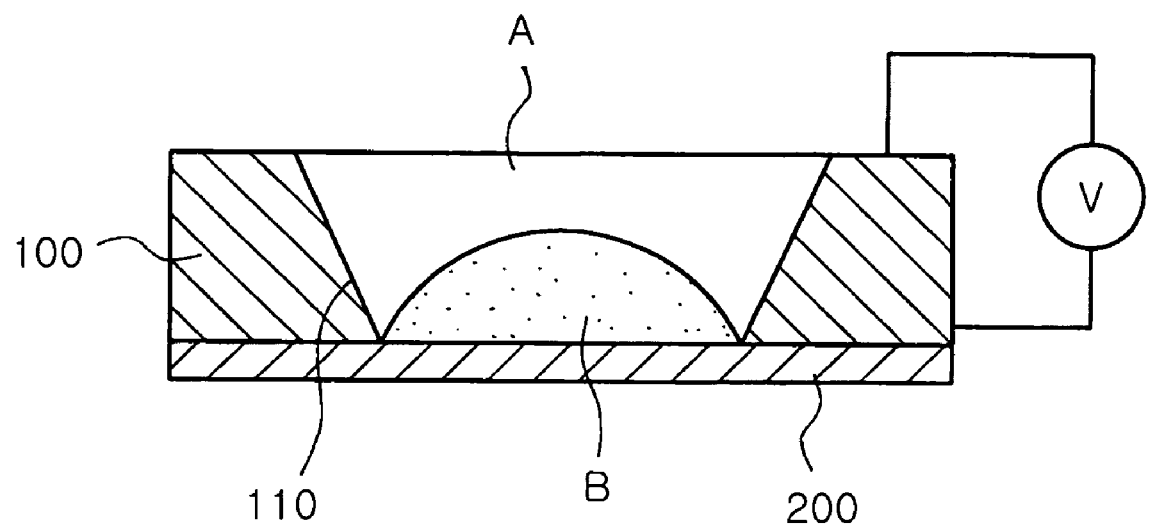
FIG. 5 is a cross-sectional view illustrating a liquid lens when electrowetting has occurred to a maximum amount according to the invention.

FIG. 5 is a cross-sectional view illustrating a shape of a liquid lens when electrowetting has occurred to a maximum amount.

As shown in FIG. 5, when electrowetting has occurred to a maximum amount, the interface is convexed upward maximally and the edge of the interface 10 abuts on the lower circumference of the hole 110. Here, if the interface has a height greater than the height Y obtained by Equations 1 and 2, the central portion of the interface is located outside the hole 110 so that the interface cannot be shaped as a partial sphere. This leads to uneven refractivity, preventing the electrolytic and insulating fluids A and B from functioning as a lens.

Accordingly, the hole 110 has a height greater than a bigger one of a height of the interface before electrowetting occurs and the height of the interface when electrowetting has occurred to a maximum amount.

To calculate the height of the interface shown in FIG. 5, first, a volume of the insulating fluid A should be decided and then a contact angle of a final interface, i.e., when electrowetting has occurred to a maximum amount, should be set.

First, the volume $V_{oil}$ of the insulating fluid A is calculated according to following Equation 3.

$$V_{oil} = \frac{\pi}{3}(X^3 - R^3)\tan\alpha - (\text{sgn})\frac{\pi\rho^3}{3}(\cos^3\theta' - 3\cos\theta' + 2) \qquad \text{Equation 3}$$

Here, where $\theta'>0$, (sgn)=+1, and where $\theta'<0$, (sgn)=−1.

$\rho$ represents a curvature radius of an initial interface and is defined according to following Equation 4.

$$X = \rho \sin\theta' \qquad \text{Equation 4}$$

With the volume $V_{oil}$ of the insulating fluid A determined by above Equation 4, a curvature radius $\rho_w$ of the final interface after a voltage is applied can be obtained according to following Equation 5.

$$\rho_w = \left[ \frac{V_{oil} + \frac{\pi}{3}R^3 \tan\alpha}{\frac{\pi}{3}\left\{ \sin^3\theta'_w \tan\alpha - (\text{sgn})(\cos^3\theta'_w + 2) \right\}} \right]^{\frac{1}{3}} \qquad \text{Equation 5}$$

Here, where $\theta' \geqq 0$, (sgn)=+1, and where $\theta'<0$, (sgn)=−1.

In this fashion, the curvature radius $\rho_w$ of the final interface determines the height of the interface when electrowetting has occurred to a maximum amount. Consequently, the hole 110 has a height greater than or equal to a bigger one of the height of the interface before electrowetting takes place and the height of the interface when electrowetting has taken place to a maximum amount.

Typical liquids used in electrowetting have a contact angle of 150 degrees or more, and thus mostly the hole 110 has a minimum height as shown in FIG. 4.

However, a cavity may be formed in the inner wall of the hole 110 to be filled with the insulating fluid B before electrowetting occurs and the electrolytic fluid A when electrowetting has occurred to a maximum amount. In this case, when electrowetting has taken place to a maximum amount, a portion of the insulating fluid B filled in the cavity is flown out of the cavity to convex the central portion of the insulating fluid B more upward. Thus, the height of the interface shown in FIG. 5 can be the minimum height of the hole 10. As a result, when the cavity is formed as just described, the volume $V_{oil}$ of the insulating fluid B is determined by adding a volume of the cavity to the value calculated by Equation 3.

Figure 6:
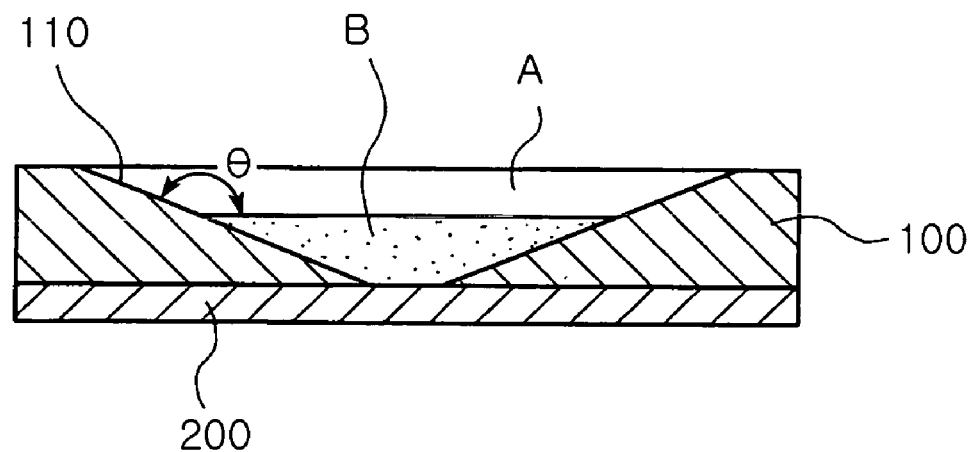
FIG. 6 is a cross-sectional view illustrating a liquid lens according to a fourth embodiment of the invention.

FIG. 6 is a cross-sectional view illustrating a liquid lens according to further another embodiment of the invention.

As shown in FIG. 6, the inner wall of the hole 110 may be inclined at a smaller angle and the interface may be formed substantially horizontal to further reduce the height of the hole 110.

Yet, the inner wall of the hole 110 inclined at a much smaller angle increases width of the liquid lens, thereby expanding size thereof. Also, this narrows a bottom surface of the hole 110 through which light propagates, thereby reducing transmissibility of light.

Therefore, preferably, the hole 110 is formed larger by 10 to 50 degrees with respect to a value obtained by subtracting the contact angle of the initial interface from 180 degrees.

As set forth above, according to preferred embodiments of the invention, a hole is perforated to a minimal depth considering a shape of the liquid interface which is governed by a contact angle and an inclination angle of the hole, thereby achieving slimness and miniaturization and enhancing operability of the liquid lens.

While the present invention has been shown and described in connection with the preferred embodiments, it will be apparent to those skilled in the art that modifications and variations can be made without departing from the spirit and scope of the invention as defined by the appended claims.

What is claimed is:

1. A liquid lens comprising:
a chamber having a hole formed therein; and
insulating and electrolytic non-miscible fluids housed in the hole, with the insulating fluid located at a bottom side, to form a spherical interface, the insulating and electrolytic fluids having different refractivities, wherein the hole has a height greater than or equal to a bigger one of a height of an initial interface before electrowetting occurs and a height of a final interface when electrowetting has occurred to a maximum amount, wherein the initial interface has a height according to following Equations 1 and 2, $$y = X\tan(\theta'/2), \quad \text{Equation 1}$$

$$X = R\left[\frac{\tan\alpha}{\tan\alpha - \tan(\theta'/2)}\right], \quad \text{Equation 2}$$

wherein y is a value of the height, X is a radius of an uppermost end of the hole, R is a radius of a lowermost end of the hole, $\theta'$ is a contact angle at the initial interface $-\pi/2$, and $\alpha$ is an inclination angle of an inner wall of the hole.

2. The liquid lens according to claim 1, wherein the final interface has a height according to the above Equation 1 and the following Equations 3, 4 and 5, $$V_{oil} = \frac{\pi}{3}(X^3 - R^3)\tan\alpha - (\text{sgn})\frac{\pi\rho^3}{3}(\cos^3\theta' - 3\cos\theta' + 2), \quad \text{Equation 3}$$

wherein where $\theta' \geq 0$, (sgn)=+1, and where $\theta'<0$, (sgn)=−1, $$X = \rho\sin\theta', \quad \text{Equation 4}$$

$$P_w = \left[\frac{V_{oil} + \frac{\pi}{3}R^3\tan\alpha}{\frac{\pi}{3}\{\sin^3\theta'_w\tan\alpha - (\text{sgn})(\cos^3\theta'_w + 2)\}}\right]^{\frac{1}{3}}, \quad \text{Equation 5}$$

wherein where $\theta' \geq 0$, (sgn)=+1, and where $\theta'<0$, (sgn)=−1, and wherein y is a value of the height, X is a radius of an uppermost end of the hole, R is a radius of a lowermost end of the hole, $\theta_w'$ is a contact angle of the final interface $-\pi/2$, $\alpha$ is an inclination angle of an inner wall of the hole, $\rho$ is a curvature radius of the initial interface, $\rho_w$ is a curvature radius of the final interface, and $V_{oil}$ is a volume of the insulating solution.

3. The liquid lens according to claim 2, wherein the hole is filled with the insulating fluid when electrowetting does not occur in the inner wall of the hole and the hole is filled with the electrolytic fluid when electrowetting has occurred to a maximum amount, and, wherein a volume of the hole is added to a value calculated according to the above Equation 3 to define the volume $V_{oil}$ of the insulating solution, thereby setting the height of the hole.

4. The liquid lens according to claim 3, wherein an inclination angle of the hole is set larger by 10 to 50 degrees with respect to a value obtained by subtracting the contact angle of the initial interface from 180 degrees.

5. The liquid lens according to claim 2, wherein an inclination angle of the hole is set larger by 10 to 50 degrees with respect to a value obtained by subtracting the contact angle of the initial interface from 180 degrees.

6. The liquid lens according to claim 1, wherein an inclination angle of the hole is set larger by 10 to 50 degrees with respect to a value obtained by subtracting the contact angle of the initial interface from 180 degrees.

* * * * *